Patented Jan. 9, 1923.

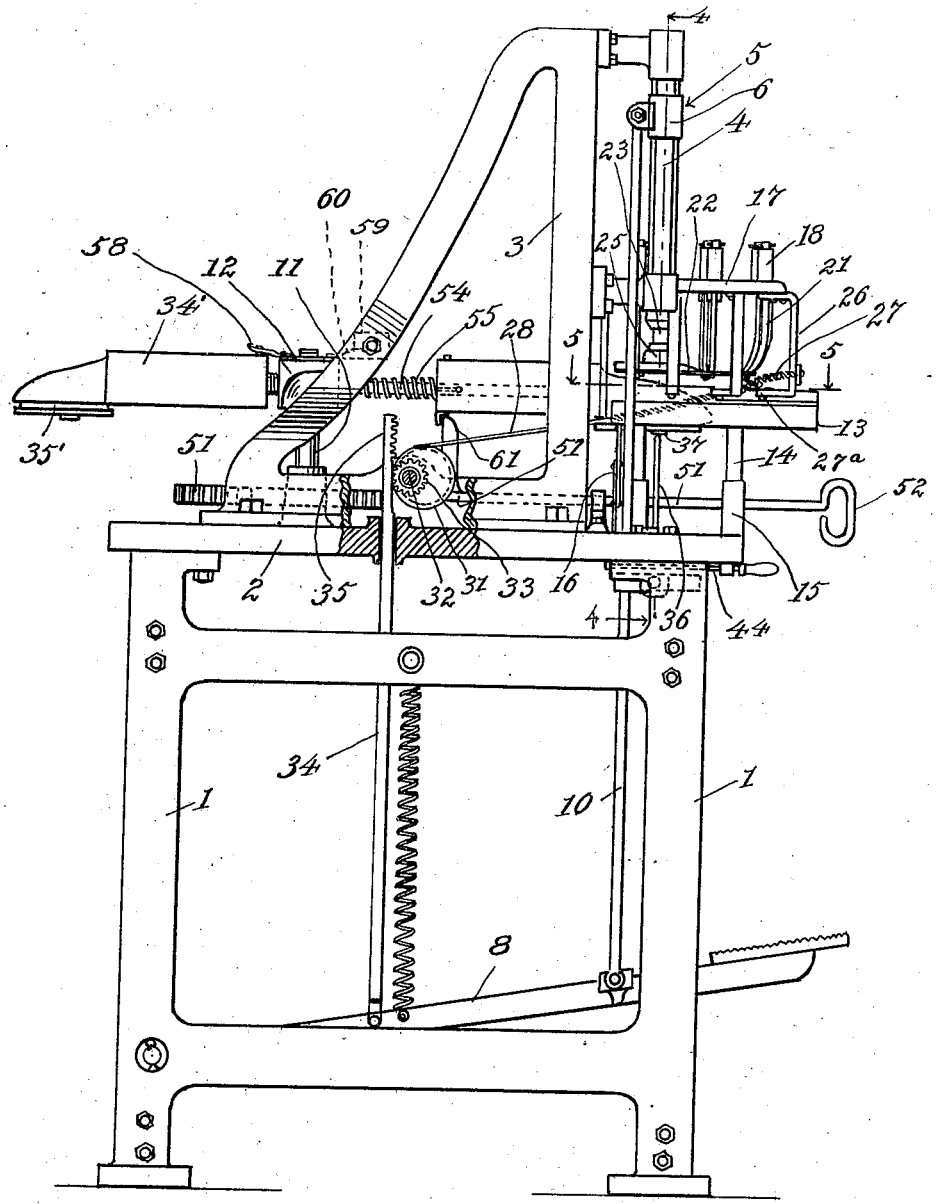

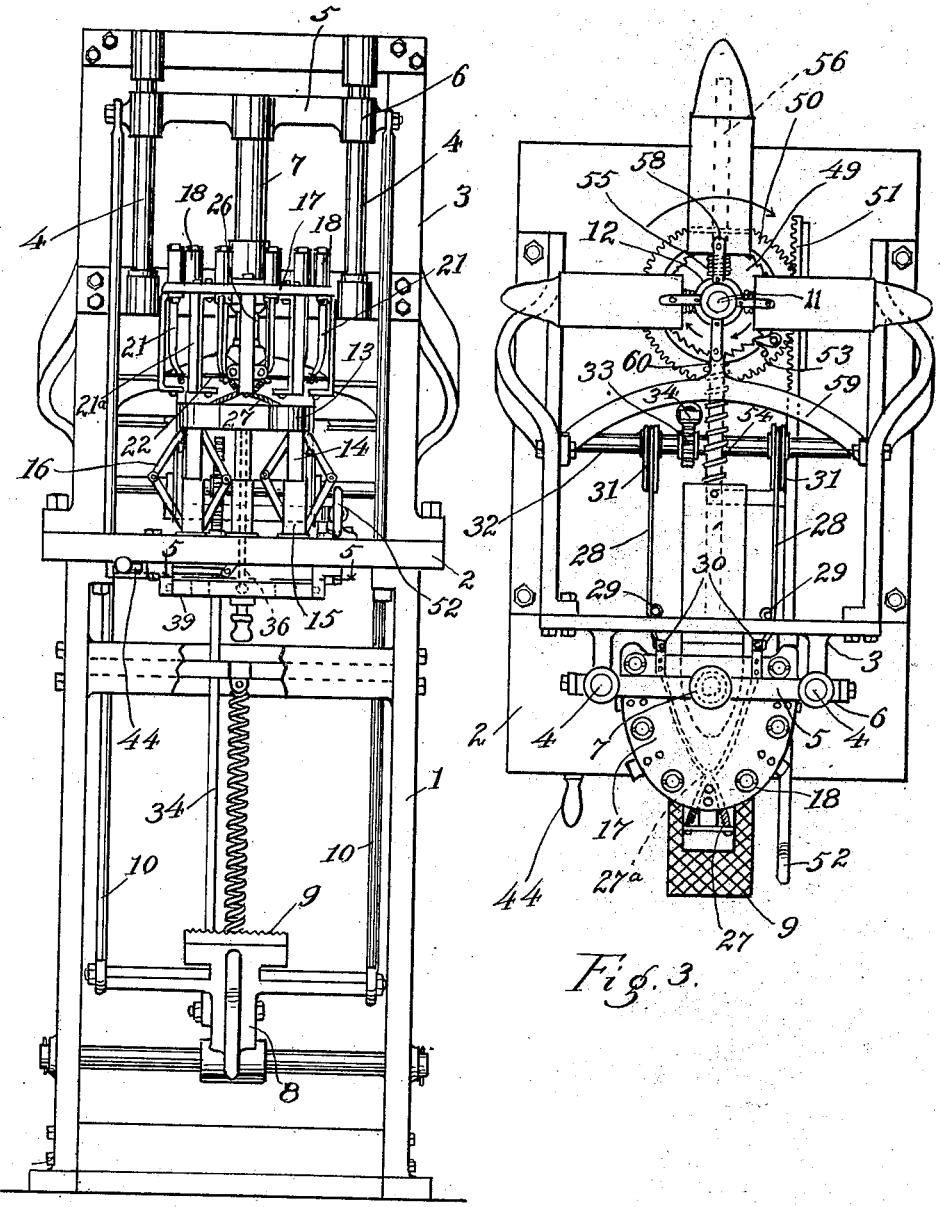

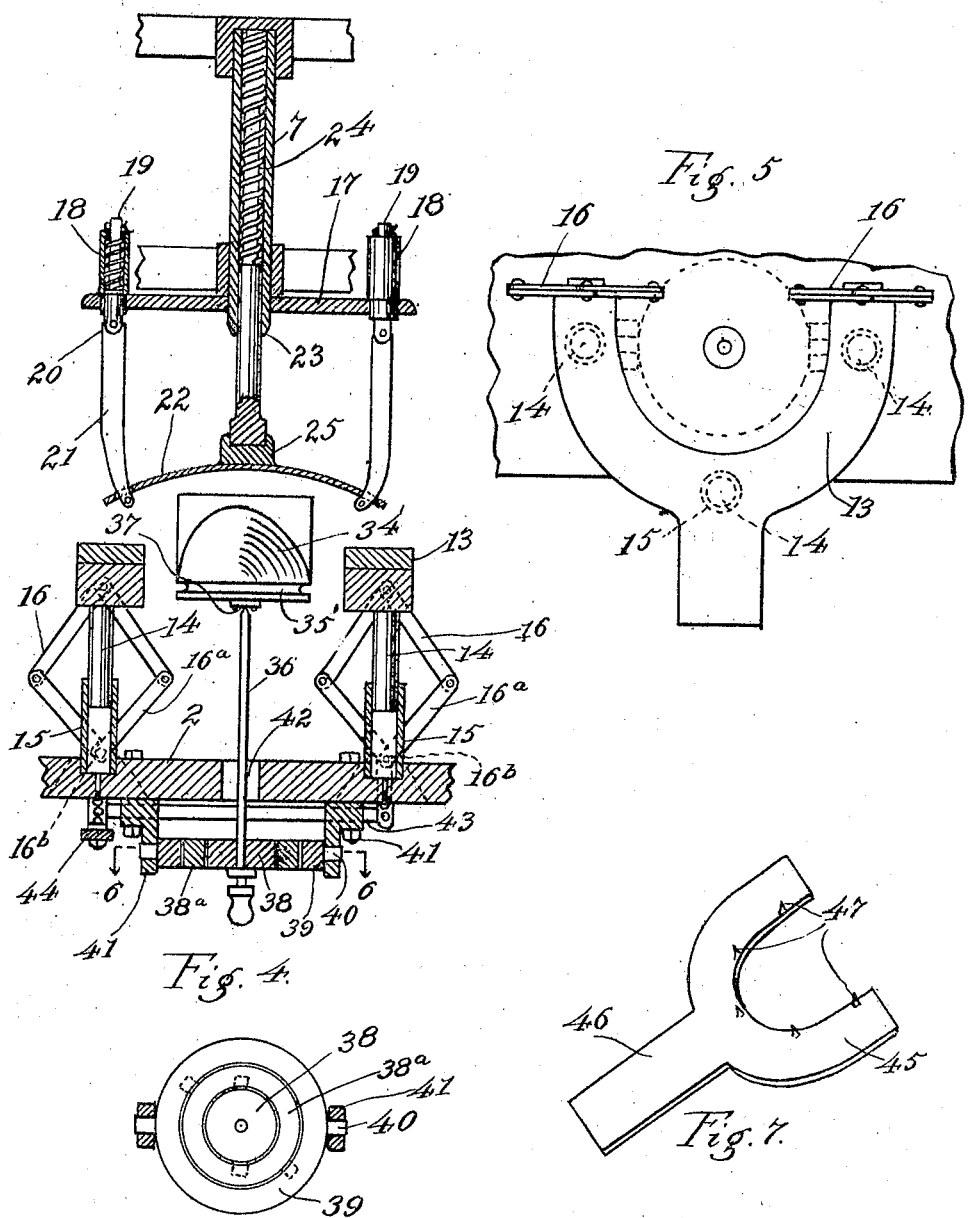

1,441,456

UNITED STATES PATENT OFFICE.

ALBERT J. RYAN, OF CINCINNATI, OHIO.

MACHINE FOR MOLDING BOX TOES.

Application filed June 30, 1919. Serial No. 307,676.

*To all whom it may concern:*

Be it known that I, ALBERT J. RYAN, a citizen of the United States, and a resident of Cincinnati, in the county of Hamilton and State of Ohio, have invented certain new and useful Improvements in a Machine for Molding Box Toes, of which the following is a full, clear, and exact description, reference being had to the accompanying drawings, forming a part of this specification.

My invention relates to machine for molding box toe pieces prior to their incorporation into the shoe along with the upper according to that process of manufacturing shoes set forth in my application for patent bearing Serial No. 284,701, filed March 24, 1919, to which reference is hereby made.

The object in this machine is to provide a means for molding smoothly without wrinkles or folds, a piece of plastic material, over a last for a desired shape of toe, said material taking thereby a permanent molded form, in which form it is inserted in the shoe.

The problems involved are increased by the necessity of forming a dependent or re-entrant shoulder for the permanent or hardened box toe piece whereby the same may be stitched into the shoe. Furthermore the adapting of the machine to use with toe lasts of various sizes and shapes requires special centering devices and resilience of parts to accommodate the machine to its various requirements.

In an application for patent filed by me on March 24, 1919, Serial No. 284,701, I describe a machine for pressing box toes over the lasts of shoes after their incorporation into the upper, and after the lasting has begun on the shoe. The machine is utilizable for the purpose for which the machine of this application is specially designed, but in several respects does not provide the fullest range of movements and resiliency and the desirable centering of the pressing means, which are provided by this present machine.

The invention herein also involves the provision of means for automatically or semi-automatically inserting various toe lasts over the work table in rotation, and for a movable work table and means in addition to the pressing devices for forming a channel beneath the toe form itself.

The above various objects and other advantages to be duly noted, I accomplish by that certain arrangement and construction of parts to be hereinafter more specifically pointed out and claimed.

In the drawings,

Figure 1 is a side elevation of the machine partly broken away.

Figure 2 is a front elevation thereof.

Figure 3 is a top plan view thereof.

Figure 4 is a detail vertical section on the line 4—4 of Figure 1.

Figure 5 is a detail plan view of the work support as visible from a section taken on the line 5—5 of Figure 1.

Figure 6 is a detail plan view of the centering device as visible from a section taken on the line 6—6 of Figure 4.

Figure 7 is a plan view of a work holder.

The machine is mounted by means of a table having legs 1 and a bed 2. The bed has thereon the uprights 3, which at their forward portion support the rods 4, 4, for the cross head 5. The cross head is provided with sleeves 6, 6, engaging over and sliding on the bars of rods 4, and also a central depending hollow shaft 7. Pivoted on the table beneath the bed is the foot lever 8, having the treadle 9, which said lever is connected by bars 10 with the cross head.

On the rear portion of the bed is journalled an upright shaft 11 which supports the last carrier 12. At the forward portion of the table bed is mounted the work support 13, which is mounted by means of posts 14, sliding in dash pots 15 on the bed, and by means of double toggles 16. It is of horse shoe shape so as to permit the last to be inserted between its arms.

With this brief description of the main parts of the machine each section will be briefly dealt with under a separate subhead.

*The cross head and presser device.*

It has been noted that depression of the foot treadle draws down the cross head 5 and with it, of course, the hollow shaft 7. Mounted on the shaft 7 is a plate 17 of semi-oval shape which has distributed around its upper edge the shells 18, within which are the spring pressed plungers 19. Pivoted at 20 to the plungers are the fingers 21, said fingers being secured at their lower end to a piece of flexible material 22. Within the shaft 7 is a plunger 23 pressed by the spring 24 and between the plunger 23 and the flexible piece 22 is a buffer 25. There are also depending rigid arms 21ª set so as to contact with the work support or work carrier.

Depending from the forward edge of the plate 17 is a bracket 26 which serves as a mounting for the long spiral spring 27, which it will be noted crosses itself at 27ª.

This spring 27 passes rearwardly over the work support where it is connected to the bracket cables 28 at each end. The cables are guided over pulleys 29 and guides 30 and pass over cams 31 mounted on a shaft 32. On the shaft 32 is a pinion 33 and the cables 28 are secured fast to the cams. Reciprocally mounted in the bed 2 of the machine is a bar 34 connected to the foot lever 8. The bar has a rack 35 on its upper end, which rack meshes with the pinion 33 upon the partial depression of the foot treadle. The foot treadle has, however, considerable motion before the rack 35 comes into play.

The result, therefore, of depressing the foot treadle is to bring down the cross head and then pull on both ends of the spring 27. As shown in Figures 1, 3 and 4 a toe mold 34′, has been inserted beneath the cross head, this toe mold, having a channel 35′ therein, the box toe piece in plastic condition is inserted and held over the toe mold and the depressing of the cross head brings the buffer 25 down over the toe piece. Further depression forces the plunger 23 upwardly and permits the fingers 21 to stretch the flexible member 22 tightly and firmly over the toe piece. The spring 27 will be drawn into the channel 35′ coming under the member 22 and toward the fingers on the depression of the foot lever before the forces described will come into play to smoothly and finely mold the box toe piece to conform to the toe mold.

*The work support and centering device.*

I have found that it is exceedingly important to have the toe last or form held beneath the cross head by means of a device which is self centering. This is because the various sizes and shapes of toes result in bringing the true working centers of the lasts into varying positions with relation to the machine. In order to get a perfectly molded box without wrinkles the toe last must be free to properly center when under pressure, so that all parts of the toe are equally pressed.

For this purpose a supporting post 36 is used which post bears against a plate 37 which is secured to the toe molds. The post finds its mounting in the central disk 38, forming the central member of a series of concentric rings 38ª and 39 having their pivotal centers out of line with each other. The outer ring 39 being mounted pivotally at 40 on brackets 41 depending from the table 2. The table is provided with a wide orifice 42 giving considerable freedom of movement to the post 36. Such a ring device is ordinarily termed a gimbal.

When the pressure members are brought down over the box toe pieces on the toe last, the last will tip to give a firm flat pressure over the buffer 25, and this will throw the post 36 out of exact vertical position. The mounting device described however, will permit the movement of the post in any required angle without altering the firmness of its support to the toe last.

It has been stated that the work support 13 is formed in the shape of a horse shoe, supported on posts 14 sliding in dash pots 15 on the table 2. At the rear ends of the horse shoe are the table toggles 16 having a pivot 16ᵇ, on the bed 2. One of the toggle arms 16ª for each element extends downwardly beyond that pivot 16ᵇ, and the two extensions are linked together with the bar 43. The lever 44 is pivoted to the end seat of the table 2 and engages the bar 43. This construction permits the work support 13 to be raised and lowered by toggle members 16ª, as will be readily observed. Any sort of bifurcated tool may be employed for placing the box toe pieces over toe last beneath the cross head. The tool will preferably be shaped like the work support itself and the box toe piece will be placed in the machine in plastic condition. The depression of the cross head resulting in molding the box, as above described, will force the work support downwardly out of the way, but the dash pot arrangement will prevent the easy depression of the table, thereby resulting in a stretching action caused partly by the pressure from the flexible member 22, but mainly by the rigid arms 21ª forcibly holding the toe piece on the work support, thereby stretching and "wiping" it in around the toe last. The stretching caused by the arms 21ª will usually be found sufficient to form a well molded toe without any flexible member being used at all, but I prefer that both means be employed for perfect results.

A form of tool for inserting the box is shown in Figure 7, having the bifurcated end 45, handle 46 and prongs 47. These prongs tend further to increase the stretching action, that is, they retain the box toe piece on the work support. For each operation of the machine the work support must be elevated, as has been described. The tool or work holder shown is merely illustrative, as some better way of retaining the box without tearing the edges by the prongs might well be devised.

*The last mounting means.*

It it desired to provide a device for presenting in rotation a series of last for the rights and lefts of at least two sizes of shoes. For this purpose a rotary post 11 is located in the rear of the machine table with a ratchet 49, secured fast thereto. Loosely mounted from the post is a pinion 50 which meshes with a rack 51. The rack 51 is slidably mounted on the machine table and operated by means of a handle 52. The pinion 50 has a pawl 53 thereon, so that motion is transmitted to the ratchet 49 from one direction only.

Radially mounted on the post 11 are the bars 54 which have springs 55 upon them. The toe lasts are recessed at 56 to receive the bars 54. The post 11 has a block 12 thereon, from which the bars 54 radiate and on this block 12 are a series of spring catches 58 which hold the lasts close up to the post. Located in a cross bar 59 between the standards of the machine is a knock off plate 60 which releases the last which has been turned to a position facing the support. Upon this the spring 55 will shoot the last forward until it strikes an abutment plate 61 on the rack bar 51.

To change lasts, therefore, the operator pushes in on the handle 52 which returns the last to its latch 58. The handle 52 is then pulled forward which will revolve the last holder around until another last is released and shoots forward.

This mechanism is shown merely as indicating some form of semi-automatic provision of a rotation of lasts. The entire machine might readily be made automatic but it is not believed to be necessary to show and describe a diversity of means for accomplishing the mechanical operations which have been described.

Having thus described my invention, what I claim as new and desire to secure by Letters Patent is:

1. In a device of the characted described, the combination with a means to form a box toe piece over a last therefor comprising in part means to engage the piece throughout the fore part of its periphery, of a last support for the last, said support adapted to permit the last to center itself under influence of the force applied thereto.

2. In a device of the character described, the combination with a depressible contact member as one component of an element to form a box toe over a last therefor said element also comprising in part means to engage the piece throughout the fore part of its periphery, of a last support for a last to be operated upon, said support adapted to permit the last to center itself beneath the depressible contact member.

3. In a device of the character described, the combination with means to form a box toe piece over a last therefor, of a last support for a last to be operated upon comprising at least in part a post to receive the last opposite the point of pressure, and a support for said post, adapted to permit it to tip freely while retaining the last for operation thereon by the forming means.

4. In a device of the character described, the combination with an element to form a box toe piece over a last therefor, of a last support for a last to be operated upon comprising at least in part a post to receive the last opposite the point of pressure, and a gimbal support for said post, comprising concentric rings pivoted along axes at angles to each other, with the post mounted in the center thereof.

5. In a device of the character described, the combination with a flexible member adapted to come down over the toe of a last, of a work support adapted to retain a box toe piece at its edge portions with the main portion lying over the toe of the last, whereby the flexible member and work support co-operate to stretch the toe piece over the last.

6. In a machine of the character described, the combination of a resilient presser member to initially contact with the toe of a last, of a flexible member about said presser member to come down and around the toe of a last and a support for a last adapted to permit the last to center itself, for the purpose described.

7. In a machine of the character described, the combination of a resilient presser member to initially contact with the toe of a last, a flexible member about said presser member to come down and around the toe of a last, a resilient means for sustaining a box toe piece over the toe of a last and co-operating with the flexible member to stretch the same, and a support for a last adapted to permit the last to center itself, for the purpose described.

8. In a machine of the character described, means for supporting a last, a presser member comprising in part flexible means for coming down and around the toe of the last, and a work support positioned around the toe of the last, said work support being free to move downward in a retarded manner under pressure from the presser member.

9. In a machine of the character described, means for supporting a last, a presser member comprising in part flexible means for coming down and around the toe of the last, a work support positioned around the toe of the last, said work support being free to move downward in a retarded manner under pressure from the presser member, and means for raising said work support for new operations.

10. In a machine of the character described, the combination with a presser member for forming a box toe over the toe of a last, of means for mounting a succession of lasts, comprising a rotary member, having last supports thereon, means for extending the lasts on their supports, means for rotating the supports and means controlling the extending means to advance the lasts when opposite the presser member.

11. In a machine of the character described, the combination with a presser member for forming a box toe over the toe of a last, of means for mounting a succession of lasts, comprising a rotary member, having last supports thereon, means for extending the lasts on their supports, means for rotating the supports and means controlling the extending means to advance the lasts when opposite the presser member, said means for rotating the supports being adapted to withdraw the lasts from extended position.

12. In a machine of the character described, means for supporting a last, a depressible work support for retaining at its edges throughout its fore part, a box toe piece over the toe portion of the last, and a depressible member adapted to move downwardly against the box toe piece and the work support to form a clamping engagement with the edges of the piece, whereby said work support and depressible member accomplish a stretching of the toe piece over the last.

13. In a machine of the character described, means for supporting a last, a depressible work support for retaining at its edges throughout its fore part, a box toe piece over the toe portion of the last, a depressible member adapted to move downwardly against the box toe piece and the work support to form a clamping engagement with the edges of the piece, whereby said work support and depressible member accomplish a stretching of the toe piece over the last, and a wiping element adapted to wipe the box toe piece around the edges of the toe.

14. In a machine of the character described, means for supporting a last, a depressible work support for retaining a box toe piece over the toe portion of the last, and a depressible member adapted to move downwardly against the box toe piece and the work support in such manner that said work support and depressible member accomplish a stretching of the toe piece over the last, and press the edges of the toe piece against a shoulder beneath the toe portion of the last.

ALBERT J. RYAN.